No. 769,001. Patented August 30, 1904.

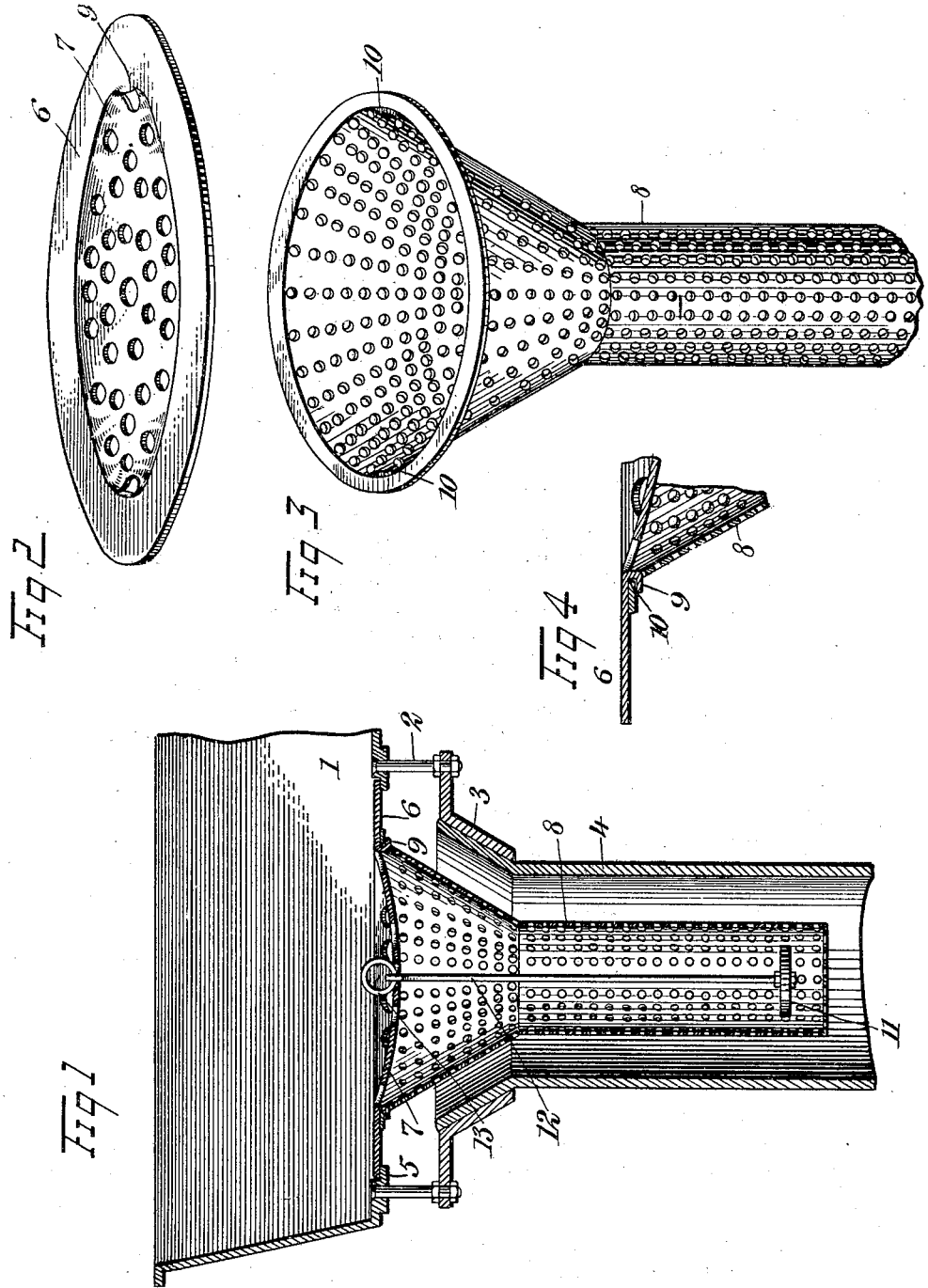

UNITED STATES PATENT OFFICE.

HARRY GORDEN LAWRENCE, OF SALT LAKE CITY, UTAH.

SINK-STRAINER.

SPECIFICATION forming part of Letters Patent No. 769,001, dated August 30, 1904.

Application filed February 19, 1904. Serial No. 194,355. (No model.)

*To all whom it may concern:*

Be it known that I, HARRY GORDEN LAWRENCE, a citizen of the United States, and a resident of Salt Lake City, in the county of Salt Lake and State of Utah, have invented a new and Improved Sink-Strainer, of which the following is a full, clear, and exact description.

My invention relates to devices for straining the discharge from sinks and other similar vessels.

The objects of my invention are to provide a strainer of the character mentioned which shall be capable of application to any sink, which requires no change of the pipes in order to put it in place, which can be easily removed for cleaning purposes, and which can be manufactured at very small expense and be thoroughly efficient to accomplish the desired objects.

Reference is to be had to the accompanying drawings, forming a part of this specification, in which similar characters of reference indicate corresponding parts in all the figures.

Figure 1 represents in sectional view a sink with a preferred form of my invention attached thereto. Fig. 2 is a perspective view of an ordinary strainer commonly applied to sinks provided with means for attaching my improved device thereto. Fig. 3 is a perspective view of my improved strainer, and Fig. 4 is a fragmentary sectional view showing a method of attaching it to the ordinary strainer.

In the drawings, 1 represents a sink with bolts or studs 2 connecting to it a supporting-frame 3, which carries the waste-pipe 4. On the bottom of the sink is a ledge 5, designed to support an ordinary strainer 6, as shown. This strainer is provided with a depressed portion 7, which is provided with perforations, as shown.

My strainer consists of a perforated or foraminous metallic receptacle 8, which is attached to the strainer 6 by means of lugs 9, with which the latter is provided, and which extend through holes 10 in the upper part of the strainer 8. The strainer 8 is preferably shaped as shown, with a vertical cylindrical portion, a bottom, and a flared portion at the top fitting the upper strainer 6, as shown. All these parts are provided with perforations which are preferably considerably smaller than the perforations in the strainer 6. Within the strainer 8 I preferably place a cleaner 11, attached to a rod 12, hung by means of a ring 13 from the center of the strainer 6.

It will be obvious that this device will stop many things which might pass through the ordinary form of strainer that is employed in sinks—for example, coffee-grounds and the like. It will also stop a large percentage of the grease that passes through the strainer 6. Being formed, preferably, of one piece of metal, it can be manufactured at very small expense, and it can be applied to any sink without expensive alterations. It fits down within the house side of the trap, is self-supporting when once put in place, and does not require the service of a skilled mechanic to place and replace it for cleaning purposes. It may be readily lifted out by means of the rod 12 and ring 13 in an obvious manner.

Having thus described my invention, I claim as new and desire to secure by Letters Patent—

1. The combination of a sink having a depression, a perforated plate seated in said depression, outwardly-projecting lugs on said plate, and a perforated receptacle attached to said lugs.

2. In a sink-strainer, the combination of a perforated plate, a perforated receptacle, means for attaching said receptacle to the plate, a rod depending from said plate into said receptacle, and a plate on the bottom of said rod.

3. A sink-strainer comprising a perforated plate, a perforated cylindrical receptacle having a perforated bottom and a perforated conical top portion extending from said cylindrical receptacle and a rod extending from said plate into said receptacle and having a plate thereon.

In testimony whereof I have signed my name to this specification in the presence of two subscribing witnesses.

HARRY GORDEN LAWRENCE.

Witnesses:
  ALBERT WILSON PHELPS,
  CHARLOTTE E. JEFFRIES.